Nov. 26, 1957 L. W. GARRETT 2,814,228
LATHE CROSS FEED MECHANISM
Filed April 16, 1954
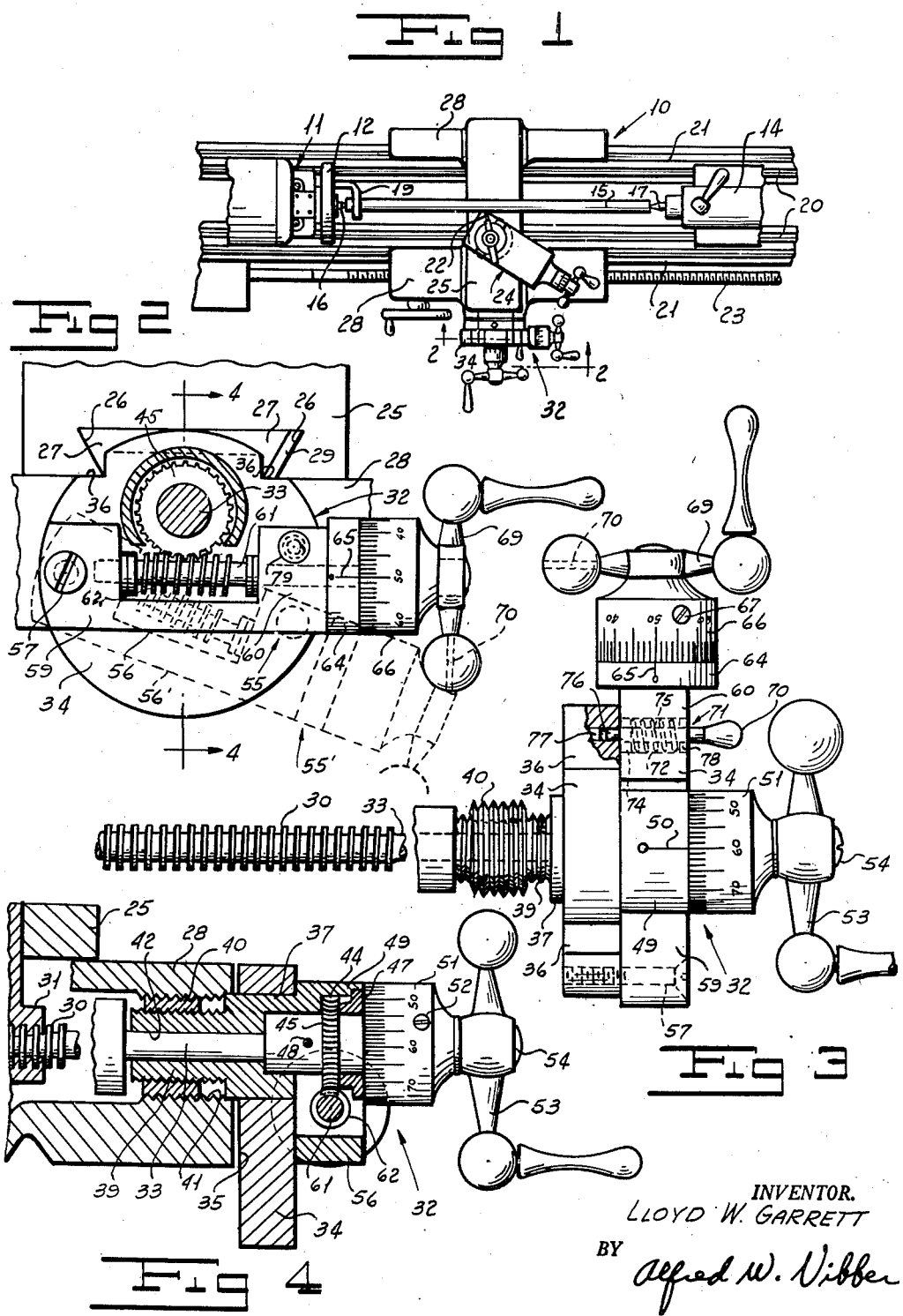
INVENTOR.
LLOYD W. GARRETT
BY
Alfred W. Vibber
ATTORNEY

United States Patent Office 2,814,228
Patented Nov. 26, 1957

2,814,228

LATHE CROSS FEED MECHANISM

Lloyd W. Garrett, Clifton, N. J.

Application April 16, 1954, Serial No. 423,574

6 Claims. (Cl. 82—24)

This invention relates to an improved cross feed mechanism for a precision lathe.

With conventional precision lathes, the process of turning a work piece to a precise diameter is a time-consuming operation, even though the work piece may be of the simplest shape, such as a circular cylinder. The inherent yieldability of the parts of the lathe, the work piece itself, and the tool make it necessary to arrive at the finally desired diameter, particularly when machining the harder metals such as steel, by use of a series of cuts. Thus, for example, it is customary to rough turn the work piece to within .005" of its final diameter by a rough cut, to take a second light cut, known as the "spring cut" which decreases the diameter of the work piece, for example, by .003", and finally to take a third, finishing, cut which removes the final .002" of diameter of the work piece and thus brings it to its final precise diameter. The spring cut is so light that it introduces practically no errors due to pressure deformation of the lathe and work piece, and thus the final cut can be made with an assurance that it will be accurate to, say, .0001", assuming that the tool has ben accurately set.

It will be seen that the accuracy of setting of the tool, particularly in making the latter two cuts, is a vital factor in the success of the machine operation. It is very difficult to obtain the required accuracy of setting of the tool with existing precision lathes, and even if it can be obtained, much time and straining of the eyes are required of the machinist.

The lathe cross feed mechanism of the invention is constructed so as to be quickly and accurately set. With such mechanism the machinist can set the tool exactly as desired for each cutting operation and will be assured that the finished work piece will conform with the specified tolerances of accuracy. The mechanism of the invention provides a means for manually turning the cross slide traverse screw, which is capable of either imparting a fast feed to the cross slide or a slow feed thereto. With each of such screw-turning means, there is associated a means for measuring its degree of turning, which is preferably calibrated with reference to the feed screw so that it functions similarly to a micrometer. The measuring means associated with the slow feeding means is thus capable of being easily read with an accuracy, as regards extent of feed of the cross slide, which far exceeds that of the measuring means associated with the fast feeding means.

Means are also provided in the mechanism of the invention whereby the slow feeding means for the screw can be selectively placed in operative or inoperative position. The construction of such means is preferably such that it can be engaged with the screw feeding means in only one angular position and so that the operations of rendering the slow feeding means operative or inoperative do not disturb the positioning of the cross slide.

As a result of such construction, the tool may be quickly set to the desired position, if the work piece is to be cylindrical, or successive positions, if the work piece is to be stepped, for making the rough cut. If the work piece is cylindrical, the slow feeding means for the screw is usually then rendered operative, and the tool is adjusted thereby in making the spring and final cuts. If, however, the work piece is stepped, the tool is usually controlled by the slow feeding means in making the spring and final cuts on the various cylindrical portions of the work piece, but is quickly traversed in or out, as required, by the fast feeding means when the location of a stepped portion is reached.

Preferably the cross slide feeding mechanism of the invention is of such construction that it may be installed on a conventional precision lathe without requiring much, if any, substantial alteration of the lathe.

The invention has among its objects the provision of a cross slide feeding mechanism for a precision lathe, which is characterized by the speed at which the slide may be fed, the accuracy of such feeding, and the ease of attachment of the mechanism to the lathe.

A further object of the invention resides in the provision of a manually operated cross slide feed mechanism of the above type wherein the slide may selectively be fed at a fast rate with the conventional accuracy of reading of the feed and may be fed slowly with a greatly enhanced accuracy of control and reading of the extent of travel of the slide.

Yet another object of the invention, in a preferred embodiment thereof, lies in the provision of a cross slide feed mechanism for a lathe wherein the slow feeding mechanism may be selectively placed in mesh with and disconnected from the cross slide screw, such meshing and disconnecting operations not disturbing the setting of the screw.

Yet another object of the invention lies in the provision of a novel means for mounting the cross slide feeding mechanism on the saddle of a lathe.

Further objects and objects relating to details and economies of construction, manufacture, assembly, and use will more definitely appear from the detailed description to follow.

My invention is clearly defined in the appended claims. In the claims, as well as in the description, parts are at times identified by specific names for clarity and convenience, but such nomenclature is to be understood as having the broadest meaning consistent with the context and with the concept of my invention as distinguished from the pertinent prior art. The best form in which I have contemplated applying my invention is illustrated in the accompanying drawings forming part of this specification, in which:

Fig. 1 is a fragmentary view in plan of a lathe equipped with a cross feed mechanism in accordance with the invention.

Fig. 2 is a fragmentary view of the cross slide feeding mechanism and a portion of the lathe, the view being partially in vertical section and partially in front elevation, the section being taken along the line 2—2 in Fig. 1, the slow feeding device including the worm and worm-journalling cradle being shown in solid lines in operative position and in dotted lines in inoperative position.

Fig. 3 is a view mainly in plan of the feeding mechanism and of the cross slide feed screw to which it is connected, the screw shaft being broken through and a part of the feeding mechanism being broken away for clarity of illustration.

Fig. 4 is a view in vertical section through a part of the lathe and through the cross slide feeding mechanism attached thereto, the section being taken along the line 4—4 in Fig. 2, portions of the screw, the screw shaft, and the worm gear, and the rotatable micrometer collar and handle as a whole, being shown in elevation.

In Fig. 1 there is shown a portion of a moderately sized precision lane, designated generally by the character 10, to which the cross feed mechanism of the invention is applied. Such lathe has the usual head stock 11 carrying a face plate 12 and a tail stock 14. A cylindrical work piece 15 is supported between the center 16 on the face plate and the center 17 on the tail stock, being driven from the face plate by the usual lathe dog 19. As usual, the lathe bed is provided with the inner ways 20, along which the tail stock may be adjusted, and the outer ways 21 on which the saddle 28 of the lathe may travel when fed either by the lathe screw 23 or manually.

The lathe tool 22 is mounted in the compound tool rest generally designated 24 supported on top of the cross slide 25 on the saddle 28. The cross slide is guided for movement on the saddle in a direction radial of the work piece between V-ways 27 on top of the saddle which cooperate with the cross slide dovetail 26, as more clearly shown in Fig. 2. An adjustable gib 29 maintains accurate engagement between the dovetail and the V-ways. Within the saddle and centrally below the cross slide is the cross slide screw 30, the rear end of which is engaged with the nut 31 attached to the cross slide and the forward shaft portion 33 of which extends forwardly through the forward face of the saddle to be connected with the cross slide feeding mechanism. For simplicity, the conventional rack-engaging gear on the enlarged portion of the screw shaft has been omitted from the illustration.

The cross feed screw adjusting means of the invention is generally designated 32. Such means is designed to replace the conventional bushing sleeve journalling the screw shaft at the front face of the saddle, and the micrometer barrel, micrometer collar, and screw-turning handle provided on the commercial lathe. Mechanism 32 has a main plate 34 which is designed to be mounted with its rear face parallel with and slightly spaced from the front face 35 of the saddle, as shown in Fig. 4. Plate 34 is generally in the shape of a disc and is so mounted that its upper edge somewhat overlies the inner portion of the V-ways of the saddle. To avoid interference with the cross slide when it is fed forwardly, plate 34 has two oppositely disposed notches or recesses 36 at the top thereof which are aligned with the lower corners of the dovetail on the slide.

It thus becomes important that, when the mechanism including plate 34 is mounted on the saddle, it shall accurately assume the position shown in Fig. 2. To provide such mounting, the rear end of the barrel 37, which engages the passage through plate 34 with a driven fit, is provided with a radially extending tubular projection 39 which is externally threaded, as shown. Threadedly engaged with projection 39 is the internally and externally threaded sleeve 40, the exterior of which is threadedly engaged with the bore 41 in the saddle. The pitches of the two sets of threads, that is, (1) that on the projection and that on the interior of sleeve 40, and (2) that on the exterior of sleeve 40 and interior of bore 41, are substantially different. For example, the first set may have a pitch of 32/inch and the second set may have a pitch of 16/inch. Engagement between the threads of the first set (1) is quite tight. For example, they may have what is known as a Class 4 fit, whereas the engagement between the threads of set (2) is relatively loose, having, for example, a Class 2 or 3 fit.

When the mechanism 32 is to be mounted on the saddle plate 34, it is first screwed into place in the bore in the saddle, the collar 51 and the handle 53 having been removed. Because of the tightness of fit between the threads of the first set, during this operation relative motion is confined to those of the second set. Usually, when plate 34 contacts surface 35 of the saddle, the mechanism as a whole will be tipped from the desired position shown in Fig. 2 when the shoulder at the rear of barrel 37 engages the bottom of the shallow counterbore at the front end of bore 41. The angle of deviation of the mechanism from that desired is noted, device 32 is removed from the saddle, and the sleeve 40 is turned on projection 39 through an angle which is twice such angle of deviation. Thereupon, when the device 32 is finally mounted on the saddle, it will be found that, because of the difference in pitches of sets 1 and 2 of the treads, plate 34, when tightly mounted on the saddle, will lie in the position shown in Fig. 2. In such position the radial oil conducting passage through member 39, shown in Fig. 3, will communicate directly with the oil hole in forward central portion of the saddle above the screw shaft.

The barrel 37 of the mechanism, which extends transversely to the plate 34, has a bore 42 therethrough receiving the shaft 33 of the feed screw. The barrel is provided with a three-stepped counterbore, the inner, smaller end of which receives the hub of the worm gear 45 and the intermediate diametered portion of which receives such gear. The gear is held from axial movement by being positioned between the bottom surface of the intermediate portion of the counterbore and the bronze washer 47 in the outer, largest portion of the counterbore. The outer surface of the washer 47 lies flush with the outer edge of barrel portion 49. Worm gear 45 is secured to shaft 33 by the set screw 48.

Affixed to the outer end of shaft 33 are the first micrometer collar 51, secured to the shaft by the set screw 52, and the crank handle 53, secured to the shaft by the retaining screw 54. The collar 51 is calibrated and cooperates with the zero mark 50 on barrel portion 49. Preferably, collar 51 is so calibrated, with reference to the pitch of screw 30, that each division represents the travel of the cross slide a distance of .001". With the slow feeding mechanism, designated as a whole at 55, swung down into the inoperative position thereof designated 55' in Fig. 2, the feed screw 30 may be adjusted rapidly in the conventional manner by turning the handle 53.

Mechanism 55 is composed of a broad, U-shaped cradle 56 pivotally mounted on the front face of plate 34 by means of the pivot screw 57. Journalled between the legs 59 and 60 of the cradle and parallel to the base thereof is the worm shaft 61 carrying the worm 62. The worm shaft extends to the right (Fig. 2) through the barrel 64 attached to leg 60 of the cradle, the shaft having a second micrometer collar 66 attached thereto by means of the set screw 67 and the handle 69 attached thereto by retaining set screw 70.

As has been indicated above, and as shown in Fig. 2, the device 55 may be positioned horizontally to mesh the worm 62 with the worm gear 45, or may be swung downwardly to pull the worm and worm gear out of mesh. Preferably, the worm is of the single lead type and the worm and worm gear have such pitch that, with any angular position of screw 30 and thus of the worm gear 45, the worm may be meshed with the gear only when it and its shaft 61 are positioned in one angular position about their axes. As a result, when device 55 is thrust upwardly and the worm is turned so it goes into mesh with the worm gear, the reading on micrometer collar 65 will bear a definite relationship to the reading on micrometer collar 51. It is further preferred that collar 66 be so calibrated with respect to worm 62 and worm gear 45 that the distance of feeding of the cross slide upon the turning of collar 66 through a given angle will bear a simple decimal relationship, such as .05, to the distance of feeding of the cross slide upon turning collar 51 through the same angle.

To retain device 55 in its upper operative position, there is provided a locking mechanism composed of the pin 71 mounted in the bore 72 at the upper edge of leg 60 of the cradle. The pin is provided with a shoulder 74 lying rearwardly of the bore, a coil compression spring lying between the shoulder and the hollow nut 78 at the end of the bore constantly urging the pin toward plate 34, a recess 77 receiving the rear end 76 of the pin to lock device 55 in its operative position. Such device may be released and swung downwardly upon withdrawing end 76 of the pin from the recess by pulling knob 79 on the pin outwardly.

It will be obvious from the above that the lathe cross feed mechanism of the invention may be used to advantage in carrying out various turning operations. One operation in which the mechanism is particularly useful is the precision turning of a number of similar pieces. In doing this work it is preferred that a first such piece be given the first, roughing cut, the slide being set for this by crank 53, the slow feeding device 55 being then in its disengaged, inoperative position. After the setting of the slide for the rough cut, the slow feeding device 55 may be swung up and locked in operative, engaged, position. The collars 51 and 66 are then both set to their zero position by loosening set screws 52 and 67, respectively, turning the collars with respect to their shafts to zero position, and then tightening the set screws. The spring cut and the finishing cut for the first work piece are conducted with the feeding of the tool controlled by crank 69.

When subsequent similar work pieces of the same series are turned, no additional setting of either of collars 51 and 66 is necessary. When the tool is being set for the first or roughing cut, device 55 is in inoperative position and screw 33 is turned by crank 53 until collar 51 reads "zero." For setting the tool for the spring and finishing cuts it is merely necessary to turn crank 69 until collar 66 reads "zero," after which device 55 may readily be swung into and locked in operative position, where it again assumes control of the tool positioning.

Whereas for purposes of illustration I have shown and described a preferred embodiment of the lathe cross feed mechanism of my invention, it is to be understood that the invention is not confined to such embodiment, since it is capable of considerable variation as to details. The invention is, therefore, to be defined by the scope of the claims appended hereto.

I claim as new the following:

1. In a lathe having a saddle, a tool-supporting cross slide on the saddle, the forward end of the slide projecting outwardly beyond the front face of the saddle in certain positions of the slide, a screw for traversing the cross slide journalled in the saddle, means for turning the screw, and a nut on the cross slide engaged with the screw, the improved mechanism for turning the screw through accurately predetermined angles which comprises: a plate mounted on the front face of the saddle beneath the cross slide so that the slide may be adjusted outwardly past the plate, a first gear on the screw shaft outwardly of and close to the front face of the saddle, a second shaft positioned transversely of the screw shaft, cradle means mounted on the outer face of the plate below the screw shaft, said cradle means including a barrel journalling the second shaft, a second gear on the second shaft, means mounting the cradle for selective movement upwardly toward the screw shaft to engage the first and second gears and downwardly away from the screw shaft to disengage the first and second gears, the drive through the gears from the second to the first markedly reducing the speed of rotation, locking means to hold the cradle with the second gear in engagement with the first gear, a collar on the second shaft outwardly of the barrel, the barrel and collar bearing cooperating indicia whereby they function as a micrometer, and a handle on the transverse shaft for rotating the second gear.

2. In a lathe having a saddle, a tool-supporting cross slide on the saddle, a screw for traversing the cross slide journalled in the saddle, means for turning the screw, and a nut on the cross slide engaged with the screw, the improved mechanism for turning the screw through accurately predetermined angles which comprises: a mechanism mounting means secured to the forward face of the saddle, a worm gear on the screw shaft outwardly of and close to the forward face of the saddle, a second shaft positioned transversely of the screw shaft and lying below the worm gear, elongated cradle means pivotally mounted adjacent one end thereof on the mechanism mounting means and below the screw shaft, a worm on the second shaft selectively engageable with and disengageable from the worm gear when the cradle is turned upwardly toward and downwardly away from the screw shaft, respectively, selectively operable locking means for the cradle to hold the worm in engagement with the worm gear, a handle on the transverse shaft to rotate the worm, and cooperating micrometer means mounted on the cradle and the transverse shaft to indicate the extent of turning of the shaft.

3. In a lathe having a saddle, a tool-supporting cross slide on the saddle, a screw for traversing the cross slide journalled in the saddle, means for turning the screw, and a nut on the cross slide engaged with the screw, the improved mechanism for turning the screw through accurately predetermined angles which comprises: a mechanism mounting means secured to the forward face of the saddle, the mounting means lying below the cross slide so that the slide may be adjusted outwardly past the mounting means, a worm gear on the screw shaft outwardly of and close to the forward face of the saddle, a second shaft positioned transversely of the screw shaft and lying below the worm gear, elongated cradle means pivotally mounted adjacent one end thereof on the mechanism mounting means and below the screw shaft, a worm on the second shaft selectively engageable with and disengageable from the worm gear when the cradle is turned upwardly toward and downwardly away from the screw shaft, respectively, selectively operable locking means for the cradle to hold the worm in engagement with the worm gear, a handle on the transverse shaft to rotate the worm, and cooperating micrometer means mounted on the cradle and the transverse shaft to indicate the extent of turning of the shaft.

4. Mechanism as set forth in claim 3 in which the mounting means includes a sleeve-like portion journalling the outer end of the screw shaft, the outer end of the sleeve-like portion constituting a hood about the top and sides of the worm gear, the hood being open at the bottom to provide for the access of the worm to the worm gear.

5. An attachment for a lathe saddle having a threaded passage inwardly from the front face surrounding the outer end of a cross slide traversing screw shaft, said attachment comprising a support having an externally threaded tubular projection adapted to extend into said passage, with the tubular projection surrounding the traversing screw shaft, an internally and externally threaded sleeve threaded on the threaded portion of said tubular projection and adapted to have its external threads engage the threads of the passage, a surface on said support adapted to engage the saddle, the external and internal threads of said sleeve being of different pitch to afford engagement between said surface on the support with the saddle with the support in desired angular position, and micrometer means on said support for angularly adjusting the screw shaft.

6. An attachment as set forth in claim 5 comprising a worm gear on the outer end on the screw shaft, a transverse shaft bearing a worm, a cradle journalling the transverse shaft, and means mounting the cradle on the support for selective movement of the worm into and out of engagement with the worm gear.

References Cited in the file of this patent

UNITED STATES PATENTS

| 874,176 | Fischer | Dec. 17, 1907 |
| 995,726 | Runge | June 20, 1911 |
| 1,508,794 | Ingham | Sept. 16, 1924 |
| 1,680,590 | Bouillon | Aug. 14, 1928 |
| 2,227,178 | Cheever | Dec. 31, 1940 |
| 2,373,934 | Williams | Apr. 17, 1945 |
| 2,565,628 | Ravilious | Aug. 28, 1951 |

FOREIGN PATENTS

| 951,214 | France | Oct. 19, 1949 |